(12) United States Patent
Juels

(10) Patent No.: US 8,934,940 B1
(45) Date of Patent: Jan. 13, 2015

(54) PROVIDING ENHANCED SECURITY FOR WIRELESS TELECOMMUNICATIONS DEVICES

(75) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/967,239

(22) Filed: Dec. 14, 2010

(51) Int. Cl.
*H04M 1/00* (2006.01)

(52) U.S. Cl.
USPC .................. 455/550.1; 455/414.1; 455/575.1; 455/440

(58) Field of Classification Search
USPC ............................ 455/550.1, 550, 575.1, 440
See application file for complete search history.

(56) References Cited

U.S. PATENT DOCUMENTS

| | | | |
|---|---|---|---|
| 2003/0134657 A1* | 7/2003 | Norta et al. .................... | 455/550 |
| 2006/0052109 A1* | 3/2006 | Ashman et al. ................ | 455/440 |
| 2010/0160004 A1* | 6/2010 | Alameh et al. .............. | 455/575.1 |
| 2011/0021243 A1* | 1/2011 | Shin et al. ................... | 455/550.1 |
| 2011/0159857 A1* | 6/2011 | Faith et al. .................. | 455/414.3 |
| 2011/0187642 A1* | 8/2011 | Faith et al. ..................... | 345/158 |
| 2011/0189981 A1* | 8/2011 | Faith et al. .................. | 455/414.1 |
| 2011/0191237 A1* | 8/2011 | Faith et al. ........................ | 705/39 |
| 2011/0218880 A1* | 9/2011 | Hammad et al. ........... | 705/26.41 |

OTHER PUBLICATIONS

Czeskis, Alexei et al., RFID and Secret Handshakes: Defending Against Ghost-and-Leech Attacks and Unauthorized Reads with Context-Aware Communications, CCS '08 Proceedings of the 15th ACM Conference on Computer and Communications Security, ACM New York, NY USA, pp. 479-490.

* cited by examiner

*Primary Examiner* — Charles Shedrick
(74) *Attorney, Agent, or Firm* — Krishnendu Gupta; Jason A. Reyes; John T. Hurley

(57) ABSTRACT

A method and system for use in providing enhanced security for wireless telecommunications devices is disclosed. In at least one embodiment, the method and system may use a sensor of a wireless telecommunications device to help derive physical context data associated with the wireless telecommunications device. The physical context data can be used to determine whether the wireless telecommunications device has been moved in a gesture that is consistent with a use of the wireless telecommunications device for a specific purpose.

20 Claims, 4 Drawing Sheets

content truncated …

PROVIDING ENHANCED SECURITY FOR WIRELESS TELECOMMUNICATIONS DEVICES

BACKGROUND

1. Field of the Invention

The present invention relates to providing enhanced security for wireless telecommunications devices.

2. Description of Related Art

The use of portable electronic devices and telecommunication devices has increased rapidly in recent years. Likewise, the use of such devices to conduct short-range, contactless, wireless transactions is increasing. For example, Near Field Communication (NFC) or Radiofrequency Identification (RFID) technology enables the wireless exchange of data between devices over a short distance. This technology, for instance, allows for the exchange of credit card information with a merchant terminal by tapping or waving the NFC- or RFID-enabled device within a close proximity to the merchant terminal. The merchant terminal can then read and use the information to perform a commercial transaction.

Using wireless communication technology to exchange sensitive information may present security and privacy concerns. For example, an NFC or RFID device may include several features that may present vulnerabilities, e.g., the device may use an external power supply, communicate wirelessly, communicate unknowingly, include persistent state memory that can be modified by a reader during a transaction, and perform computation. These features may be used by attackers to perform tracking, scanning, and man-in-the-middle attacks.

A tracking attack may occur when a potentially legitimate merchant uses a wireless reader to extract data from a device. A scanning attack may be performed by practically anyone at any time, such as in a crowded subway car. In this attack, an unauthorized reader may be used to extract information from a device. A man-in-the-middle attack is possible when a device is able to successfully mimic end-point devices, e.g., a purchaser's device and/or a merchant terminal. Such an attack can result in the purchaser's device and the merchant device exchanging information without knowledge of a clandestine device intercepting and replaying, or relaying, potentially private information.

To help prevent such attacks, countermeasures can be taken to help ensure that a device exchanges information only when intended.

SUMMARY OF THE INVENTION

A method and system for use in providing enhanced security for wireless telecommunications devices is disclosed. In at least one embodiment, the method and system may use a sensor of a wireless telecommunications device to help derive physical context data associated with the wireless telecommunications device. The physical context data can be used to determine whether the wireless telecommunications device has been moved in a gesture that is consistent with a use of the wireless telecommunications device for a specific purpose.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in providing enhanced security for a wireless telecommunications device. In at least one embodiment, the technique may be used by a telecommunications device to exchange information with another device only when the telecommunications device is moved in a gesture indicating an intent to do so. This may provide enhanced security for a telecommunications device by helping ensure that the device is not unintentionally exchanging data with another device.

Figure 1:
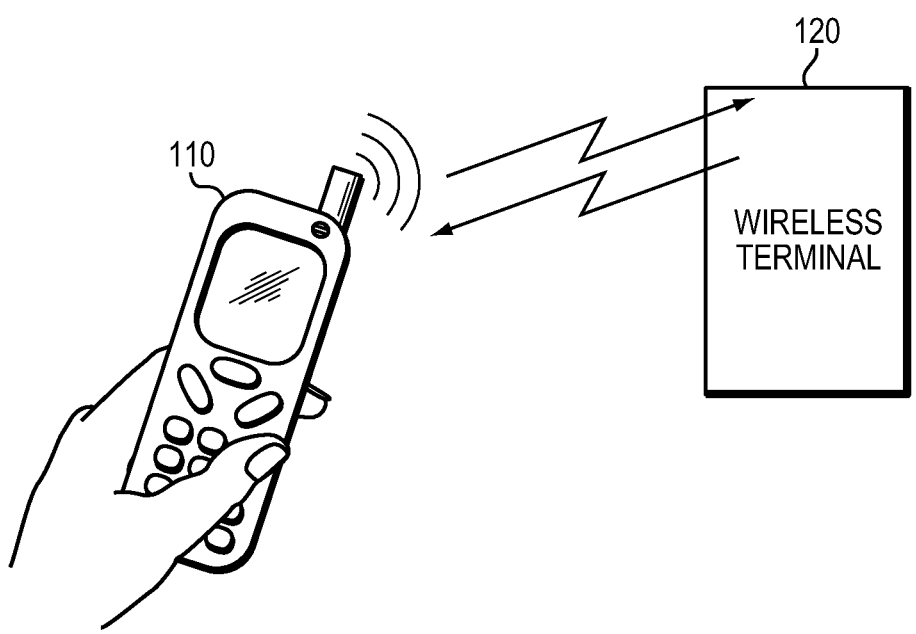
FIG. 1 illustrates devices that may be used with an embodiment of the technique described herein.

Referring to FIG. 1, illustrated is a device being used in accordance with an embodiment of the current technique. As shown, device 110 can be a telecommunications device wirelessly communicating with wireless terminal 120. In some example embodiments, wireless terminal 120 may be a merchant terminal, a public-transportation terminal, an access control terminal, an authorization terminal, or an identification terminal. These examples of wireless terminal 120 may all exchange information with device 110 to perform a specific operation. For example, a merchant terminal may obtain credit card information from device 110 to process a commercial transaction, or an access control terminal may obtain information from device 110 to determine whether a user and/or device is authorized to access a particular area or resource.

Device 110 can take various forms in various embodiments of the current technique, provided that the device 110 performs the functions required of the device 110 for secure authentication. The device 110 can be implemented in packages having a wide variety of shapes and form factors. For example, in some embodiments the device 110 can be, or be incorporated within, a telecommunications device such as a cellular telephone, or a cellular telephone with specialized embedded hardware adapted to interact with the cellular telephone's circuitry, such as a SIM card. In other embodiments, the device 110 can be an RFID-enabled credit-card sized and shaped device, or can be much smaller or much larger. One credit-card sized embodiment of the device 110 includes a microprocessor with on-board memory, a power source, and a small LCD display. Embodiments may optionally include a keypad or buttons for PIN entry, entry of authentication information requests, or for other entry or interaction with the device 120. In another embodiment, a credit-card sized device 110 may include a processor with on-board memory that may be used as a "smart card," that can be installed into another device that provides power and/or an interface. In still other embodiments, device 110 can be a e-passport. Other sizes, shapes, and implementations are possible without departing from the spirit of the invention.

In some embodiments, device 110 may exchange information with wireless terminal 120 only upon indication of an intent to do so. In at least one embodiment, the requisite intent may be found when device 110 is moved in a gesture that is consistent with a use of device 110 for a specific purpose. For example, as illustrated in FIG. 1, when a wireless device such as device 110 is being used to initiate a transaction with a merchant terminal, a "tapping" gesture with the device is customarily performed. Alternatively, a "swiping" gesture may be performed. In accordance with an embodiment of the current technique, one of these gestures may be required before device 110 is activated to allow for information to be exchanged between device 110 and the merchant terminal. Thus, no commercial transaction may occur using device 110 if it has not been gestured in a way that conveys the intent to initiate a commercial transaction.

Figure 2:
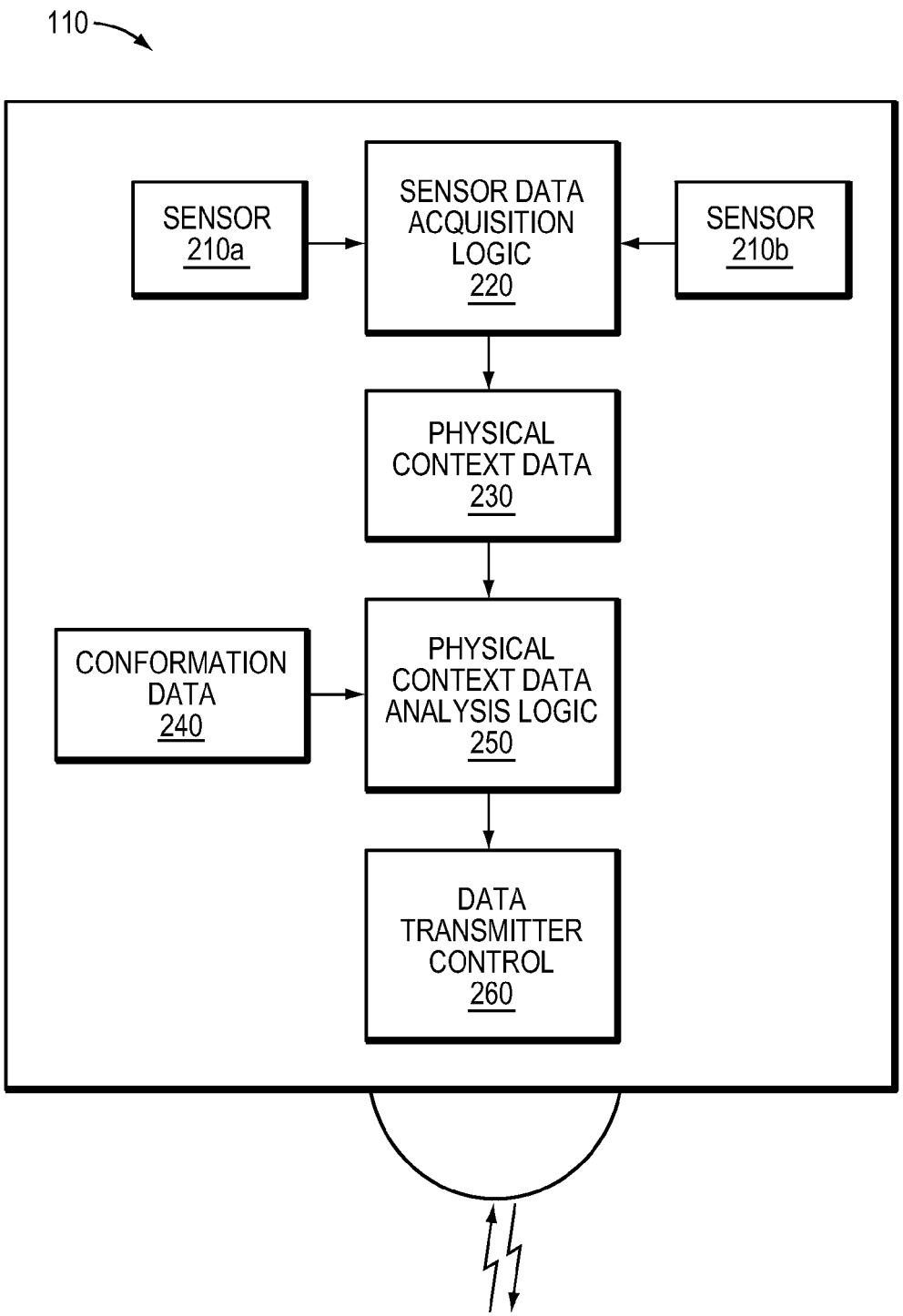
FIG. 2 illustrates a component diagram that may be used with an embodiment of the technique described herein.

Referring now to FIG. 2, shown is a component diagram of an example embodiment of device 110. As shown, device 110 includes sensors 210*a* and 210*b*, which are capable of detecting motion. In a particular embodiment, FIG. 2 may also include sensor data acquisition logic 220 that may be used to help produce physical context data 280. Physical context data analysis logic 250 may perform analysis of physical context data 280 using conformation data 240. Data transmitter control 260 may be included to control data transmittal.

Although two sensors are shown in FIG. 2, any number and/or variety of sensors may be used in accordance with the current technique. In some embodiments, sensors may also be integrated with other components of device 110. One example sensor that is capable of detecting motion is an accelerometer. An accelerometer can measure a device's acceleration or de-acceleration in one or more dimensions and can, therefore, be used to help determine how device 110 is being moved.

Device 110 may incorporate a gyroscope, which is a sensor that can measure orientation. In at least one embodiment, a gyroscope may be used to adjust measurements received from an accelerometer or other sensors. In some embodiments, an accelerometer and a gyroscope can be used to help determine, for example, how the device is being held, at what speed the device is being moved, and in which direction the device is being moved. Accordingly, in the merchant terminal example presented above, accelerometer and/or gyroscope measurements may be used to help detect movement of device 110 and to help determine whether a device has been moved in a required tapping or swiping gesture.

Other motion-sensing or gesture recognizing sensors may be used in addition to or instead of an accelerometer and/or gyroscope. For example, device 110 may have a built-in camera that can be used to help detect motion. In an example embodiment, a camera may capture one or more (e.g., a series of) images that can be analyzed (e.g., compared with each other) to determine variations that would indicate movement. For example, the images may indicate lighting changes or changes in the location of a fixed object. In another example embodiment, device 110 may use a camera for computer vision (e.g., pattern recognition) to help determine whether a device is being used for an intended purpose. For instance, a camera may capture images that can be analyzed using pattern recognition to help determine that device 110 is being moved toward a particular wireless terminal.

A microphone may also be used to help detect motion. For instance, particular sounds a microphone captures may be indicative of movement. A sensor may also be able to help determine movement by capturing vibrations. Another sensor may detect movement by recognizing a change associated with an energy wave, such as a change in microwave signal frequency. Bluetooth or other short-range wireless communication technologies may also be used to detect movement. Additionally, geographical positioning technology such as the Global Positioning System (GPS) may be used to detect motion of a device. In other words, any device that is capable of detecting motion in any way can be a sensor for use in an embodiment of the current technique.

Figure 3:
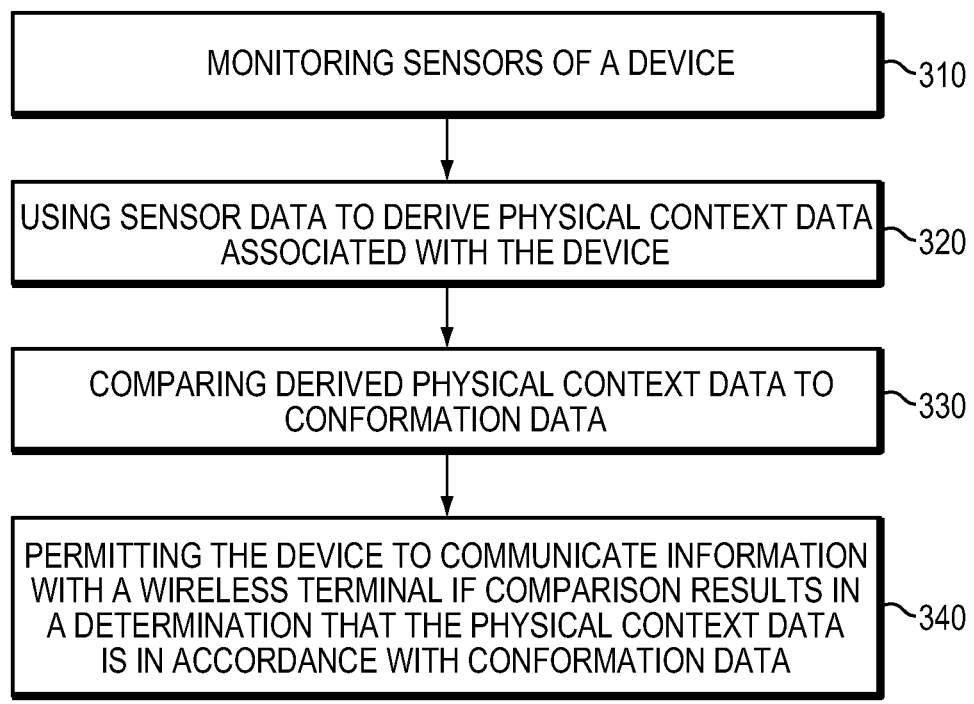
FIGS. 3 and 4 are flowcharts that may be used with an embodiment of the technique described herein.

Further explanation of the current technique and the components included in FIG. 2 will be provided with reference to FIG. 3. FIG. 3 provides a flowchart that can be used with an embodiment of the current technique. In at least one embodiment, device 110, as illustrated in the example embodiment of FIG. 2, may include sensor data acquisition logic 220, which may be responsible for monitoring one or more outputs of sensors 210*a* and 210*b* (step 310). For instance, in some embodiments, sensor data acquisition logic 220 may acquire and digitize analog sensor data produced by sensors 210*a* and 210*b*. In yet another embodiment, sensor data acquisition logic 220 may also be responsible for performing processing of data produced by sensors 210*a* and 210*b*. For example, if multiple sensors are used to determine movement of device 110, sensor data acquisition logic 220 may be responsible for acquiring, digitizing, consolidating, and manipulating sensor data to put the data in a better form for analysis.

In some embodiments, applying logic 220 to data produced by sensors 210*a* and 210*b* may result in physical context data 230 (step 320). In at least one embodiment, physical context data analysis logic 250 may compare physical context data 230 to conformation data 240 (step 330). Conformation data 240 may contain data that can be used to help determine whether device 110 was moved in a gesture that is consistent with a use of device 110 for a specific purpose. For example, in some embodiments, conformation data 240 may include data values that represent a predetermined acceptable range of acceleration or orientation for device 110 when used for commercial transactions. In this example, conformation data 240 may also include data to be used to help analyze images of a merchant terminal captured by a camera of device 110. Accordingly, if device 110 comes within a close proximity to a merchant terminal, device 110 may nevertheless remain unactivated for the purpose of conducting a commercial transaction unless the device is held and moved in such a way as to produce physical context data 230 that physical context data analysis logic 250 determines to be in accordance with conformation data 240.

In some embodiments, conformation data 240 may include movement data for multiple purposes. For example, in at least one embodiment, device 110 may also be enabled to transmit data for the purpose of gaining access to a resource or a physical location. In an example embodiment, conformation data 240 may contain data that can be used to determine whether device 110 was moved in a gesture that is consistent with how such a device is typically moved when seeking door entry. Any number of other purposes for which device 110 may be moved may also contain respective conformation data.

Once physical context data analysis logic 150 determines that a device has been moved in such a way as to produce physical context data that is in accordance with conformation data 240, data transmitter control 260 may permit the transfer of data to wireless terminal 120 (step 340). Data that may be transferred may depend on the specific devices used (i.e., device 110 and wireless terminal 120). In some embodiments, data may be private access or transaction data needed to complete a desired action such as unique identification numbers, credit card information, birth date, location, name, and address. In at least one embodiment, data may include a description of the gesture in which device 110 was moved.

In some embodiments, data transmitter control 260 may also require that a specific signal be received at device 110 from wireless terminal 120 before the transfer of data is permitted. For instance, a merchant terminal may emit a short-range signal that can be detected by device 110. In these embodiments, the signal may indicate that device 110 is at a location from which data may be transferred with wireless terminal 120.

In some embodiments in accordance with the current technique, if device 110 has been moved in a gesture that is consistent with a use of device 110 for a specific purpose, device 110 may display information to a user of device 110. In at least one embodiment, device 110 may use a display screen to request confirmation from a user that a particular data exchange is desired, or device 110 may use the display screen to convey information to the user in regards to an exchange of information. For instance, in a case where device 110 is a telecommunications device with a display screen and key pad and wireless terminal 120 is a merchant device, the display screen can be used to request confirmation for a commercial transaction and/or display information about the commercial transaction when the device is, for example, moved in a swiping gesture in relation to the merchant device indicating that a transaction may be desired.

In some embodiments, device 110 may transmit information to one or more other devices in addition to or in place of wireless terminal 120. In at least one embodiment, device 110 may detect and communicate to another device that it is being used for an unauthorized purpose or an attempt to use device 110 for an unauthorized purpose has occurred. Device 110 may communicate this information, for example, to a merchant, the owner of device 110, or public authorities, by transmitting the information to another device. For example, if device 110 detects that an unauthorized terminal has attempted to obtain information from device 110 when device 110 was not activated by a specific movement to exchange information with the terminal, device 110 may communicate information about the attempt to the appropriate authorities, for example, via a wireless or cellular connection.

Figure 4:
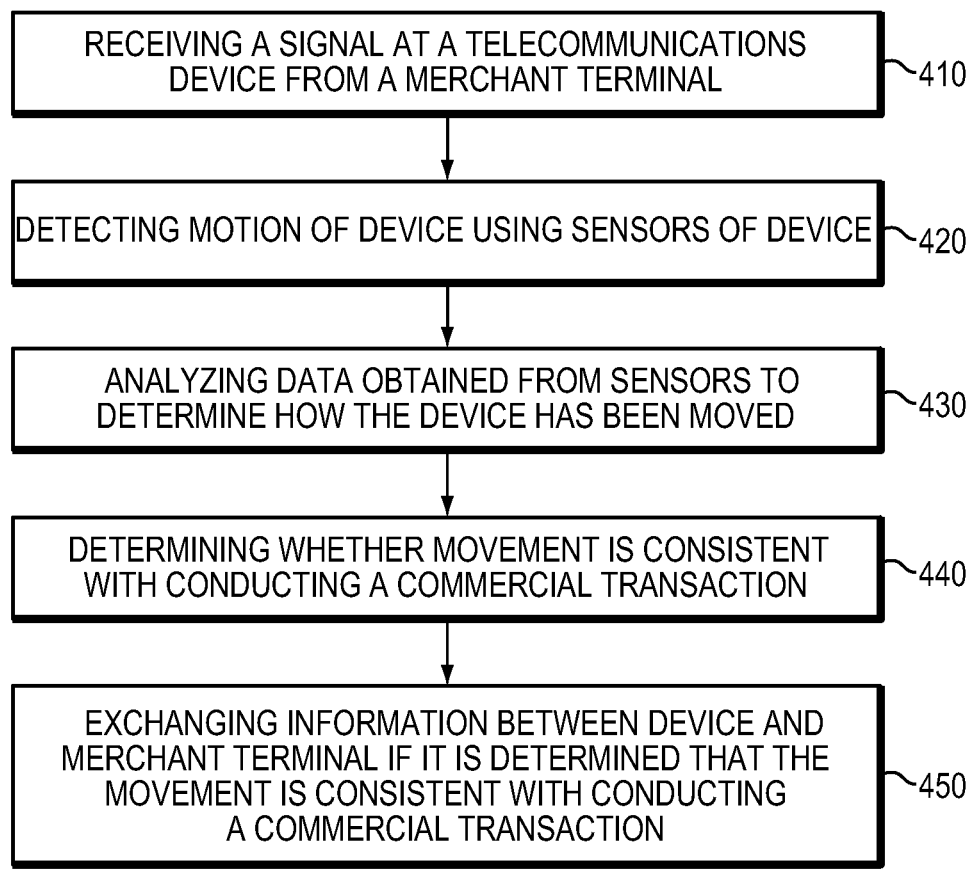

Referring to FIG. 4, shown is a flowchart illustrating processes that may be used with an example embodiment of the current technique where a telecommunications device is being used to perform a commercial transaction. The telecommunications device may receive a signal from a merchant terminal device indicating that the devices are within range to successfully complete a wireless commercial transaction (step 410). Sensors of the telecommunications device may then be used to detect whether the device has been moved (step 420). Modern telecommunications devices often have several built-in sensors that can be used to help detect motion such as, for example, an accelerometer, gyroscope, and a camera. Next, data provided by these sensors can be used to determine the device's orientation, acceleration, and direction of movement (step 430). The data can be analyzed to determine whether the telecommunications device was moved in a gesture that is consistent with conducting a commercial transaction (step 440). For instance, the device may analyze the motion data to determine whether it was moved in a tapping or swiping gesture. Moreover, it may analyze the data to determine whether the speed at which the device was moved is within a predetermined range of speeds that are typical of a commercial transaction gesture. If it is determined that the telecommunications device was moved in a gesture that is consistent with such a transaction, the device may exchange information with the merchant device to complete the transaction (step 450).

Embodiments may implement the technique herein using code executed by a processor. For example, an embodiment may implement the techniques herein using code which is executed by a processor of the device on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

The invention claimed is:

1. A method for use in providing enhanced security for wireless telecommunications devices, the method comprising:
   receiving, at a Near Field Communication (NFC) enabled wireless telecommunications device, a signal from a terminal device indicating initiation of a commercial transaction;
   using a sensor of the wireless telecommunications device to help derive physical context data associated with the wireless telecommunications device;
   using the physical context data and conformation data to determine whether the wireless telecommunications device has been moved in a gesture that is consistent with a use of the wireless telecommunications device for conducting a commercial transaction;
   permitting further communication if the determination determines that the wireless telecommunications device has been moved in a predetermined gesture and speed that is consistent with a use of the wireless telecommunications device for conducting a commercial transaction and blocking and preventing further communication if the determination determines that the wireless telecommunications device has not been moved in a predetermined gesture or speed that is consistent with a use of the wireless telecommunications device for conducting commercial transaction, wherein the communication includes exchanging commercial transaction information with a wireless terminals; and
   displaying, on the NFC enabled wireless telecommunications device, information to a user of the device requesting confirmation from the user to proceed with the commercial transaction.

2. The method of claim 1, wherein the wireless telecommunications device comprises a cellular telephone.

3. The method of claim 1, further comprising:
   using another sensor of the wireless telecommunications device to help derive physical context data associated with the wireless telecommunications device.

4. The method of claim 3, wherein one or more of the sensors are selected from a group of sensors consisting of an accelerometer, gyroscope, camera, microphone, Bluetooth receiver, and a GPS receiver.

5. The method of claim 1, wherein the sensor was previously built into the wireless telecommunications device.

6. The method of claim 1, wherein the specific purpose is to communicate information.

7. The method of claim 6, wherein the information includes personal data.

8. The method of claim 6, wherein the information includes the physical context data.

9. The method of claim 1, further comprising:
   based on the determination, enabling the device for the specific purpose.

10. The method of claim 1, further comprising:
based on the determination and a signal received from a wireless terminal, enabling the device for the specific purpose.

11. A system for use in providing enhanced security for wireless telecommunications devices, the system comprising:
first logic configured to receive, at a Near Field Communication (NFC) enabled wireless telecommunications device, a signal from a terminal device indicating initiation of a commercial transaction, wherein a sensor of the wireless telecommunications device is used to help derive physical context data associated with the wireless telecommunications device; and
second logic configured to use the physical context data and conformation data to determine whether the wireless telecommunications device has been moved in a gesture that is consistent with a use of the wireless telecommunications device for conducting a commercial transaction;
third logic configured to permit enabling further communication if the determination determines that the wireless telecommunications device has been moved in a predetermined gesture and speed that is consistent with a use of the wireless telecommunications device for conducting a commercial transaction and blocking and preventing further communication if the determination determines that the wireless telecommunications device has not been moved in a predetermined gesture or speed that is consistent with a use of the wireless telecommunications device for conducting a commercial transaction, wherein the communication includes exchanging commercial transaction information with a wireless terminal; and
fourth logic configured to display, on the NFC enabled wireless telecommunications device, information to a user of the device requesting confirmation from the user to proceed with the commercial transaction.

12. The system of claim 11, wherein the wireless telecommunications device is a cellular telephone.

13. The system of claim 11, further comprising:
using another sensor of the wireless telecommunications device to help derive physical context data associated with the wireless telecommunications device.

14. The system of claim 13, wherein one or more of the sensors are selected from a group of sensors consisting of an accelerometer, gyroscope, camera, microphone, Bluetooth receiver, and a GPS receiver.

15. The system of claim 11, wherein the sensor was previously built into the wireless telecommunications device.

16. The system of claim 11, wherein the specific purpose is to communicate information.

17. The system of claim 16, wherein the information includes personal data.

18. The system of claim 16, wherein the information includes the physical context data.

19. The system of claim 11, further comprising:
based on the determination, enabling the device for the specific purpose.

20. The system of claim 11, further comprising:
based on the determination and a signal received from a wireless terminal, enabling the device for the specific purpose.

* * * * *